(12) United States Patent
Fresko

(10) Patent No.: US 7,426,720 B1
(45) Date of Patent: *Sep. 16, 2008

(54) SYSTEM AND METHOD FOR DYNAMIC PRELOADING OF CLASSES THROUGH MEMORY SPACE CLONING OF A MASTER RUNTIME SYSTEM PROCESS

(75) Inventor: Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 745 days.

This patent is subject to a terminal disclaimer.

(21) Appl. No.: 10/745,023

(22) Filed: Dec. 22, 2003

(51) Int. Cl.
G06F 9/45 (2006.01)
(52) U.S. Cl. .................. 717/140; 717/151; 717/152; 717/153; 718/1
(58) Field of Classification Search ......... 717/151–153, 717/140; 718/1
See application file for complete search history.

(56) References Cited

U.S. PATENT DOCUMENTS

| | | | | |
|---|---|---|---|---|
| 6,374,286 B1 * | 4/2002 | Gee et al. | .................. | 718/108 |
| 6,823,509 B2 * | 11/2004 | Webb | ........................... | 718/1 |
| 6,829,761 B1 * | 12/2004 | Sexton et al. | .............. | 717/165 |
| 2003/0088604 A1 * | 5/2003 | Kuck et al. | .................... | 709/1 |

* cited by examiner

Primary Examiner—Wei Y. Zhen
Assistant Examiner—Junchun Wu
(74) Attorney, Agent, or Firm—Park, Vaughan & Fleming LLP

(57) ABSTRACT

A system and method for dynamic preloading of classes through memory space cloning of a master runtime system process is presented. A master runtime system process is executed. A representation of at least one class is obtained from a source definition provided as object-oriented program code. The representation is interpreted and instantiated as a class definition in a memory space of the master runtime system process. The memory space is cloned as a child runtime system process responsive to a process request and the child runtime system process is executed, inheriting the memory state of the parent, which reflects the data structures and state corresponding to the preloaded classes.

22 Claims, 11 Drawing Sheets

SYSTEM AND METHOD FOR DYNAMIC PRELOADING OF CLASSES THROUGH MEMORY SPACE CLONING OF A MASTER RUNTIME SYSTEM PROCESS

FIELD OF THE INVENTION

The invention relates in general to class preloading and, in particular, to a system and method for dynamic preloading of classes through memory space cloning of a master runtime system process.

BACKGROUND OF THE INVENTION

Recent advances in microprocessor design and component integration have enabled a wide range of devices to offer increasingly complex functionality and "soft" features. Soft features include software applications that enhance and customize the operation of a device. These devices include standard computing devices, such as desktop and laptop computers, portable computing devices, such as personal data assistants, and consumer devices, such as cellular telephones, messaging pagers, gaming consoles, and set top boxes. Most devices now include an operating system to support the soft features and other extensions.

The increased capabilities offered by these software-upgradeable devices have also created certain user expectations. Often, users are not technically savvy and are intolerant of performance compromises occasioned by architectural challenges, such as slow or inconsistent application performance. Similarly, users generally expect to be able to access a host of separate applications, which are implemented at the system level through multitasking. For users, widely available software applications assure a positive experience through consistency and increased exposure across multiple platforms. However, for software developers, engineering software applications for disparate computing platforms entails increased development costs and on-going support and upgrade commitments for each supported architecture.

Managed code platforms provide one solution to software developers seeking to support multiple platforms by presenting a machine-independent and architecture-neutral operating environment. Managed code platforms include programming language compilers and interpreters executed by an operating system as user applications, but which provide virtual runtime environments within which compatible applications can operate. For instance, applications written in the Java programming language, when combined with a Java virtual machine (JVM) runtime environment, can operate on heterogeneous computer systems independent of machine-specific environment and configuration settings. An overview of the Java programming language is described in P. van der Linden, "Just Java," Ch. 1, Sun Microsystems, Inc. (2d ed. 1997), the disclosure of which is incorporated by reference. JVMs are a critical component to the overall Java operating environment, which can be ported to the full range of computational devices, including memory-constrained consumer devices.

Managed code platforms are generally designed for the monotonic execution of a single application instance. Multiple instances of a managed code platform are executed to simulate multitasking behavior. Such forced concurrency, however, creates several performance problems. First, each instance incurs a startup transient. Executable and startup data must be read from slow persistent storage, which results in slow initial application performance. Similarly, memory is not shared between instances and each additional instance increases the overall memory footprint of the platform by separately loading and instantiating classes, generally problematic in memory-constrained systems. Moreover, data dependencies and deferred initialization of system state can result in non-deterministic execution patterns. Finally, each instance independently determines the relative importance of executing methods and compiles machine code on an ad hoc basis, often causing inconsistent application performance.

Deferred class loading is sometimes necessitated by the dynamic nature of the object oriented languages involved. Dynamic class loading can also adversely affect performance and cause nondeterministic execution behavior. To help improve runtime performance, managed code platforms lazily defer class loading until a class is actually referenced. Deferred class loading conserves the time required to load a class by delaying class loading and compilation until, and if, the class is actually needed. Deferred class loading sacrifices runtime performance for improved application startup. However, for near real time applications, deferred class loading causes non-deterministic execution behavior that increases worst case performance by the longest class loading execution thread. Similarly, deferred class loading exacerbates the resource usage of multiple application instances that each requires the same classes by duplicatively performing identical operations and needlessly consuming memory that could be conserved, if the memory state were shared.

Static preloading of classes and interfaces is currently supported in many Java virtual machines, which allows a build-time tool to pre-process and preload classes and to link the classes into the JVM static executable image before JVM startup. However, static preloading can result in large executable sizes and can be problematic for resource constrained devices, where boot startup time is critical and a combination of slower processor and persistent storage and modest memory can cause significant boot times.

Therefore, there is a need for an approach to providing class preloading in a managed code platform, such as the Java operating environment, to provide concurrently executable applications that share warmed up memory state and to minimize worst case performance.

SUMMARY OF THE INVENTION

A managed code platform is executed in an application framework that supports the spawning of multiple and independent isolated user applications. Preferably, the application framework supports the cloning of the memory space of each user application using copy-on-write semantics. The managed code platform includes a master runtime system process, such as a virtual machine, to interpret machine-portable code defining compatible applications. An application manager also executes within the application framework and is communicatively interfaced to the master runtime system process through an inter-process communication mechanism. The application framework logically copies the master runtime system process context upon request by the application framework to create a child runtime system process through process cloning. The context of the master runtime system process stored in memory is inherited by the child runtime system process as prewarmed state and cached code. When implemented with copy-on-write semantics, the process cloning creates a logical copy of references to the master runtime system process context. Segments of the referenced master runtime system process context are lazily copied only upon an attempt by the child runtime system process to modify the referenced context. During initialization, the master runtime system process preloads classes and interfaces likely to be required by user applications at runtime. The classes and interfaces are identified through profiling by ranking a set of classes according to a predetermined criteria, such as described in commonly-assigned U.S. patent application Ser. No. 09/970,661, filed Oct. 5, 2001, pending, the disclosure of which is incorporated by reference. An example of a suitable managed code platform and runtime system process are the Java operating environment and Java virtual machine (JVM) architecture, as licensed by Sun Microsystems, Inc., Palo Alto, Calif.

One embodiment provides a system and method for dynamic preloading of classes through memory space cloning of a master runtime system process. A master runtime system process is executed. A representation of at least one class is obtained from a source definition provided as object-oriented program code. The representation is interpreted and instantiated as a class definition in a memory space of the master runtime system process. The memory space is cloned as a child runtime system process responsive to a process request and the child runtime system process is executed.

The use of the process cloning mechanism provided by the underlying application framework provides several benefits in addition to resolving the need for efficient concurrent application execution of machine portable code. The inheritance of prewarmed state through the cloning of the master runtime process context provides inter-process sharing of preloaded classes. Similarly, each child runtime system process executes in isolation of each other process, thereby providing strong resource control through the system level services of the application framework. Isolation, reliable process invocation and termination, and resource reclamation are available and cleanly provided at an operating system level. In addition, process cloning provides fast user application initialization and deterministic runtime behavior, particularly for environments providing process cloning with copy-on-write semantics. Finally, for non-shareable segments of the master runtime system process context, actual copying is deferred until required through copy-on-write semantics, which avoids impacting application performance until, and if, the segment is required.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
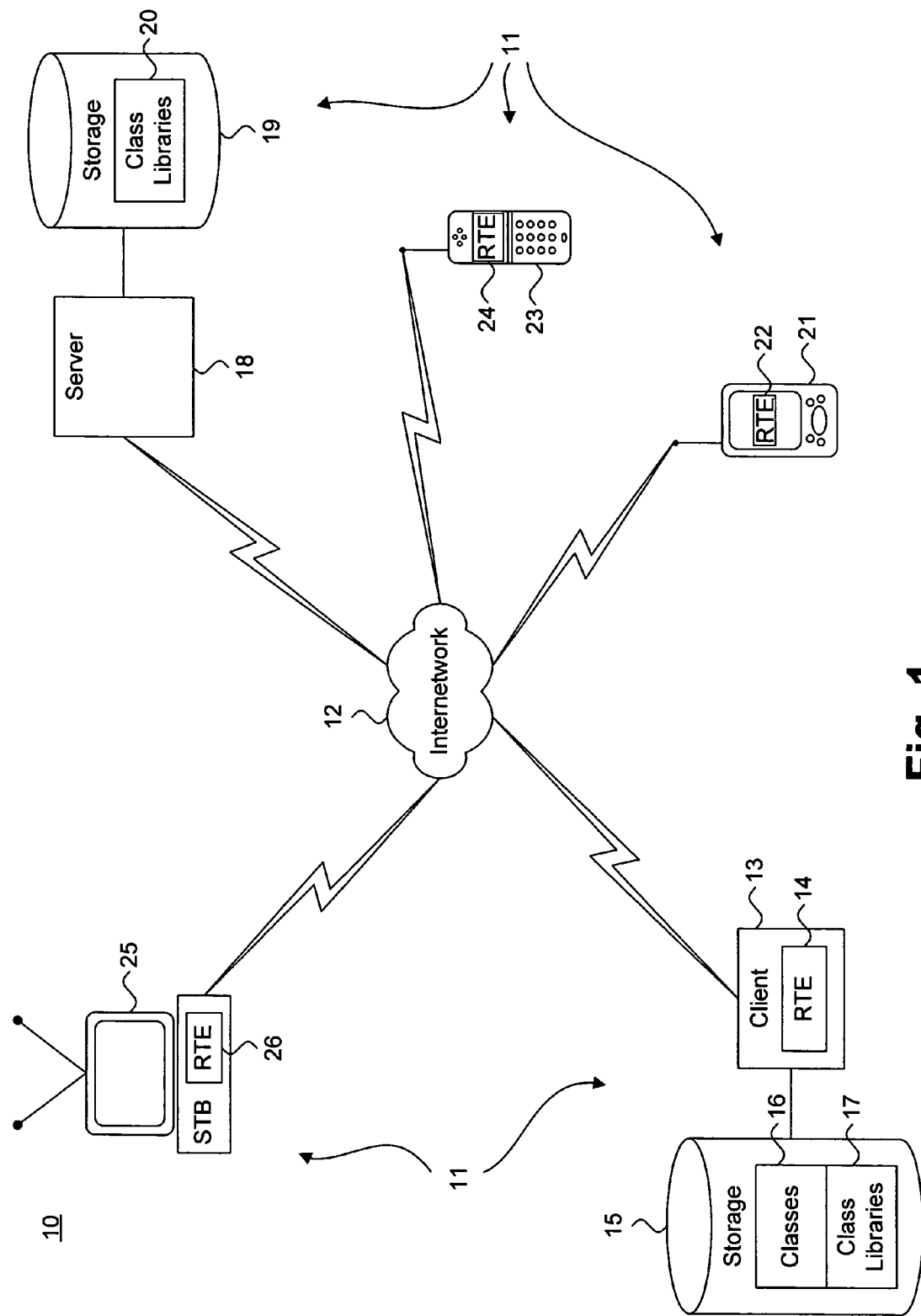
FIG. 1 is a functional block diagram showing, by way of example, runtime environments implemented on a plurality of heterogeneous devices.

FIG. 1 is a functional block diagram 10 showing, by way of example, runtime environments (RTEs) 14, 22, 24, 26 implemented on a plurality of heterogeneous devices 11. Each heterogeneous device 11 provides a managed code platform, such as the Java operating environment, executing in a runtime environment 14, 22, 24, 26, as further described below with reference to FIG. 2. The heterogeneous devices 11 include, nonexclusively, a client computer system 13, such as a desktop or laptop computer system. Each client 13 is operatively coupled to a storage device 15 and maintains a set of classes 16 and class libraries 17, which respectively define code modules that specify data structures and sets of methods that operate on the data, and shareable collections of the modules. The heterogeneous devices 11 also include portable computing devices, including personal data assistants 21, and consumer devices, such as cellular telephones 23 and set top boxes (STB) 25. Finally, a server 18 is operatively coupled to a storage device 19 in which globally shareable class libraries 20 are maintained. Each of the heterogeneous devices 11 can interface via a network 12, which includes conventional hard-wired and wireless network configurations. Other types of heterogeneous devices 11 and various network configurations, arrangements, and topologies are possible.

Each heterogeneous device 11 includes an operating system to manage resources, provide access to peripheral devices, allocate memory resources, and control program execution and termination. Each operating system supports a process cloning mechanism that spawns multiple and independent isolated user applications by cloning the memory space of specifiable processes. An example of a process cloning mechanism suitable for use in the present invention is the fork( ) system call provided by the Unix or Linux operating systems, such as described in M. J. Bach, "The Design Of The Unix Operating System," Ch. 7, Bell Tele. Labs., Inc. (1986), the disclosure of which is incorporated by reference. The process invoking the fork( ) system call is known as the parent process and the newly created process is called the child process. The operating system assigns a separate process identifier to the child process, which executes as a separate process. The operating system also creates a logical copy of the context of the parent process by copying the memory space of the parent process into the memory space of the child process. In a copy-on-write variant of the fork( ) system call, the operating system only copies references to the memory space and defers actually copying individual memory space segments until, and if, the child process attempts to modify the referenced data of the parent process context. The copy-on-write fork( ) system call is faster than the non-copy-on-write fork( ) system call and implicitly shares any data not written into between the parent and child processes.

System for Preloading Classes

Figure 2:
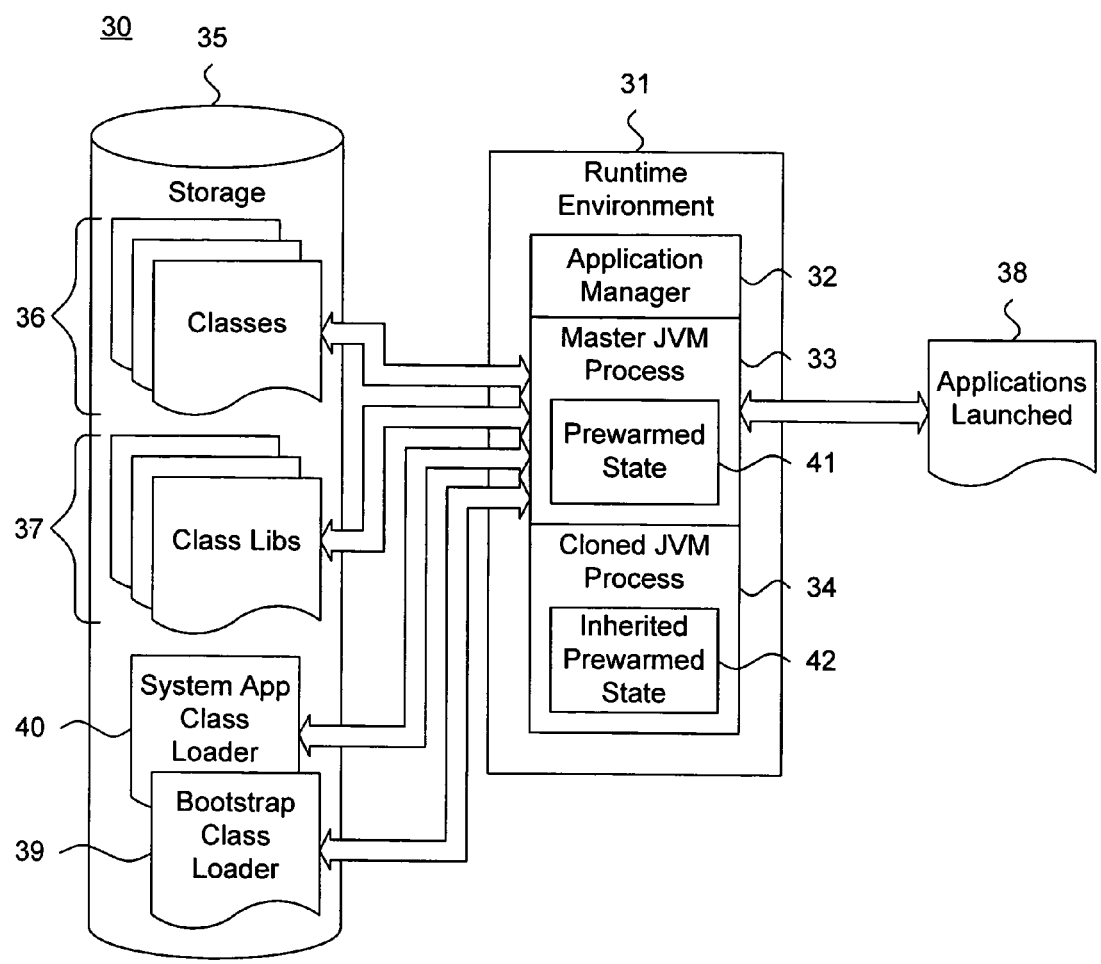
FIG. 2 is a block diagram showing a system for dynamic preloading of classes through memory space cloning of a master runtime system process, in accordance with the invention.

FIG. 2 is a block diagram 30 showing a system for dynamic preloading of classes through memory space cloning of a master runtime system process 33, in accordance with the invention. Although described with specific reference to classes, other forms of structured static data could also be preloaded, including data structures, processes, functions, subroutines, interfaces, and the like. The system consists of a runtime environment 31 and individual classes 36 and class libraries 37 that form the overall core managed code platform. By way of example, the system is described with reference to the Java operating environment, although other forms of managed code platforms that execute applications preferably written in an object oriented programming language, such as the Java programming language, could also be used.

The exemplary runtime environment 31 includes an application manager 32, master Java virtual machine (JVM) process 33 and zero or more cloned JVM processes 34. The master JVM process 33 and cloned JVM processes 34 respectively correspond to a master runtime system process and child runtime system processes. The master runtime system process, preferably provided as a virtual machine, interprets machine-portable code defining compatible applications. The runtime environment 31 need not execute cloned JVM processes 34, which are only invoked upon request by the application manager 32.

The runtime environment 31 executes an application framework that spawns multiple independent and isolated user application process instances by preferably cloning the memory space of a master runtime system process. The example of an application framework suitable for use in the present invention is the Unix operating system, such as described generally in M. J. Bach, supra at Ch. 2, the disclosure of which is incorporated by reference.

The application manager 32 presents a user interface through which individual applications can be selected and executed. The application manager 32 and master JVM process 33 preferably communicate via an inter-process communication (IPC) mechanism, such as a pipe or a socket. The master JVM process 33 is started at device boot time.

Upon initialization, the master JVM process 33 reads an executable process image from the storage device 35 and performs bootstrapping operations. These operations include preloading the classes 36 and classes defined in the class libraries 37, as further described below with reference to FIG. 10. Thus, upon completion of initialization, the memory image of the master JVM process 33 resembles that of an initialized, primed and warmed up JVM process with key classes stored in the master JVM process context as prewarmed state 41. Preferably, the prewarmed state 41 is stored as read only data.

Following the initialization, the master JVM process 33 idles, that is, "sleeps" in an inactive state, while awaiting further instructions from the application manager 32. The master JVM process 33 awakens in response to requests received from the application manager 32 to execute applications. The application manager 32 sends a request to the master JVM process 33, including standard command line parameters, such as application name, class path, and application arguments. The master JVM process 33 awakens and creates a cloned JVM process 34 as a new cloned process instance of the master JVM process 33 using the process cloning mechanism of the underlying operating system. The context of the master JVM process 33 stored in memory as prewarmed state 41 is inherited by the cloned JVM process 34 as inherited prewarmed state 42, thereby saving initialization and runtime execution times and providing deterministic execution behavior. Following the "cloning" of the cloned JVM process 34, the master JVM process 33 records the launched application in an applications launched list 38 and returns to an inactive sleep state.

When implemented with copy-on-write semantics, the process cloning creates a logical copy of only the references to the master JVM process context. Segments of the referenced master JVM process context are lazily copied only upon an attempt by the cloned JVM process to modify the referenced context. Therefore, as long as the cloned JVM process does not write into a memory segment, the segment remains shared between parent and child processes.

The master JVM process 33 recognizes the following basic commands received from the application manager 32 through the IPC mechanism:

(1) list: Provides a list of applications launched in response to requests received from the application manager 32.

(2) jexec: Invokes the process cloning mechanism, parses command line arguments and executes a new instance of the master JVM process 33 as the cloned JVM process 34. Preferably adopts a syntax compatible to standard JVM processes.

(3) kill: Terminates the application identified by an application handle or process identifier.

Other commands are possible, such as described in commonly-assigned U.S. patent application Ser. No. 10/745,164, entitled "System And Method For Performing Incremental Initialization Of A Master Runtime System Process," filed 22 Dec. 2003, pending, the disclosure of which is incorporated by reference.

During initialization, the master JVM process 33 also preloads classes 36 and classes defined in the class libraries 37 that are likely to be required by applications at runtime. The classes and interfaces are identified through profiling by ranking a set of classes according to a predetermined criteria, such as described in commonly-assigned U.S. patent application Ser. No. 09/970,661, filed Oct. 5, 2001, pending, the disclosure of which is incorporated by reference. A set of core Java foundation classes is specified in a bootstrap class loader 39 and application classes in a system application class loader 40. Class loading requires identifying a binary form of a class type as identified by specific name, as further described below with reference to FIG. 10. Depending upon whether the class was previously loaded or referenced, class loading can include retrieving a binary representation from source and constructing a class object to represent the class in memory. The master JVM process 33 maintains an internal symbol table (not shown) of classes previously loaded to resolve symbolic references. If the internal symbol table does not already contain an entry for the class name or class loader, the class loader responsible for loading the class is identified, invoked and given the name of the class.

The master JVM process 33 invokes the bootstrap class loader 39 and system application class loader 40 for every class likely to be requested by the applications. Thus, the prewarmed state 41 includes the class loading for applications prior to actual execution and the initialized and loaded classes are inherited by each cloned JVM process 34 as the inherited prewarmed state 42.

Master JVM Process Mapping

Figure 3:
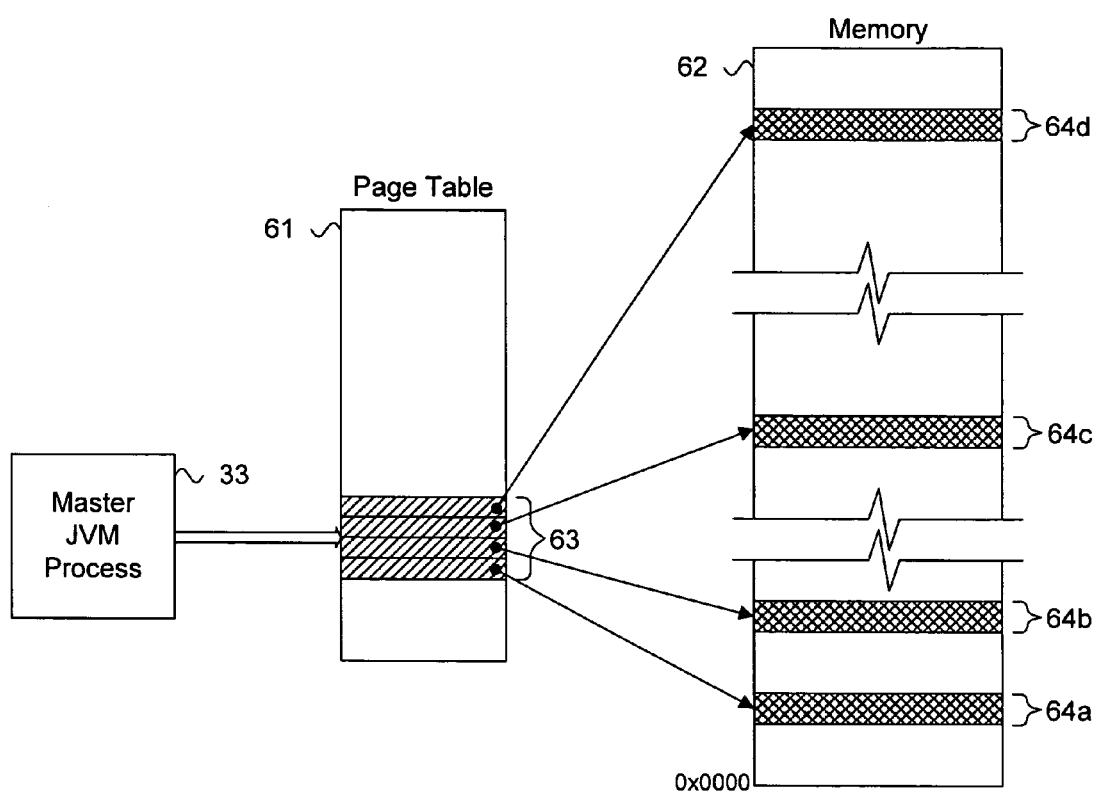
FIG. 3 is a block diagram showing, by way of example, a master JVM process mapped into memory.

FIG. 3 is a block diagram 60 showing, by way of example, a master JVM process 33 mapped into memory 62. Generally, the context for an executing process includes a data space, user stack, kernel stack, and a user area that lists open files, current directory and supervisory permission settings. Other types of context can also be provided. The context is stored and managed in the memory 62 by the operating system. At device boot time, the operating system instantiates a representation of the executable master JVM process 33 into the memory 62, possibly in non-contiguous pages 64a-d, and records the allocation of the memory space as page table entries 63 into the page table 61 prior to commencing execution of the master JVM process 33. As well, the master JVM process context could similarly be mapped using other memory management systems, such as using demand paging, swapping and similar process memory allocation schemes compatible with process cloning, particularly process cloning with copy-on-write semantics.

Cloned JVM Process Mapping

Figure 4:
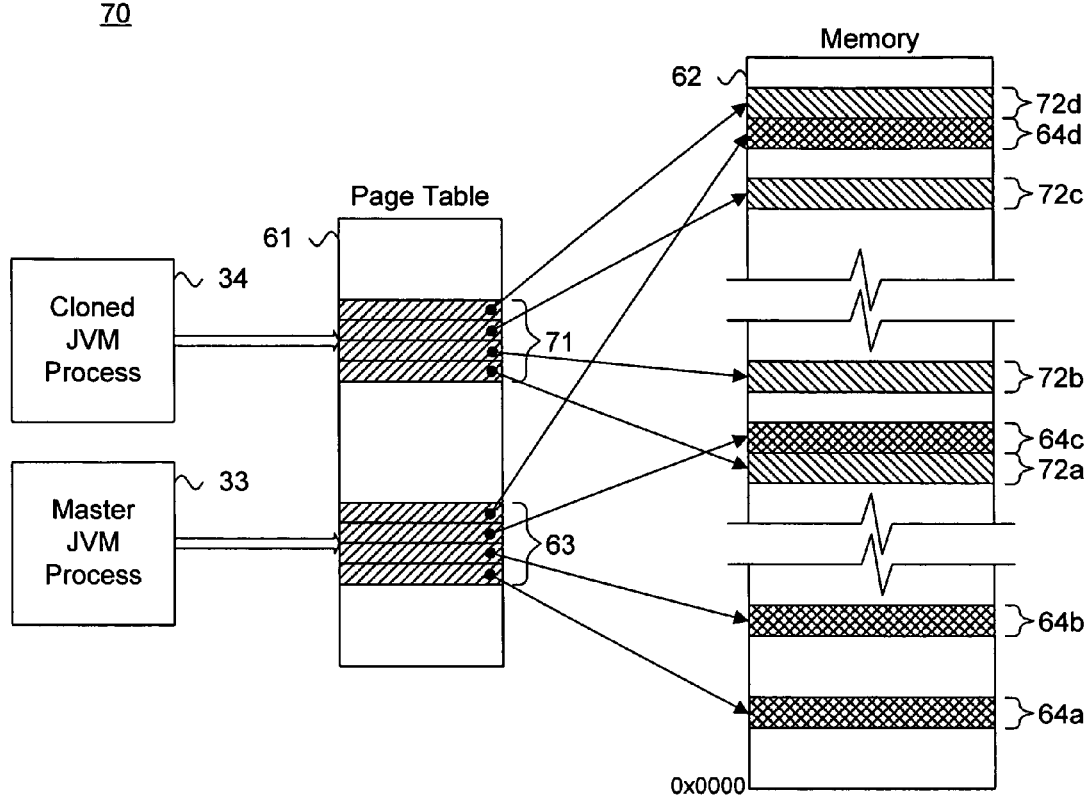
FIG. 4 is a block diagram showing, by way of example, a master JVM process and a cloned JVM process mapped into memory through memory space cloning.

FIG. 4 is a block diagram 70 showing, by way of example, a master JVM process 33 and a cloned JVM process 34 mapped into memory 62 through memory space cloning. In a system with process cloning that does not provide copy-on-write semantics, physical copies of the pages 64a-c in the memory 62 storing the parent process context are created for each child process. In response to a process cloning request, the operating system instantiates a copy of the representation of the executable master JVM process 33 for the cloned JVM process 34 into the memory 62, possibly in non-contiguous pages 72a-d, and records the allocation of the memory space as page table entries 71 into the page table 61 prior to commencing execution of the cloned JVM process 34. Thus, the cloned JVM process 34 is created with a physical copy of the context of the master JVM process 33. Since a new, separate physical copy of the master JVM process context is created, the cloned JVM process 34 inherits the prewarmed state 41, including the preloaded classes of the master JVM process 33. However, the overall memory footprint of the runtime environment 31 is increased by the memory space required to store the additional copy of the master JVM process context.

Cloned JVM Process Mapping with Copy-On-Write

Figure 5A:
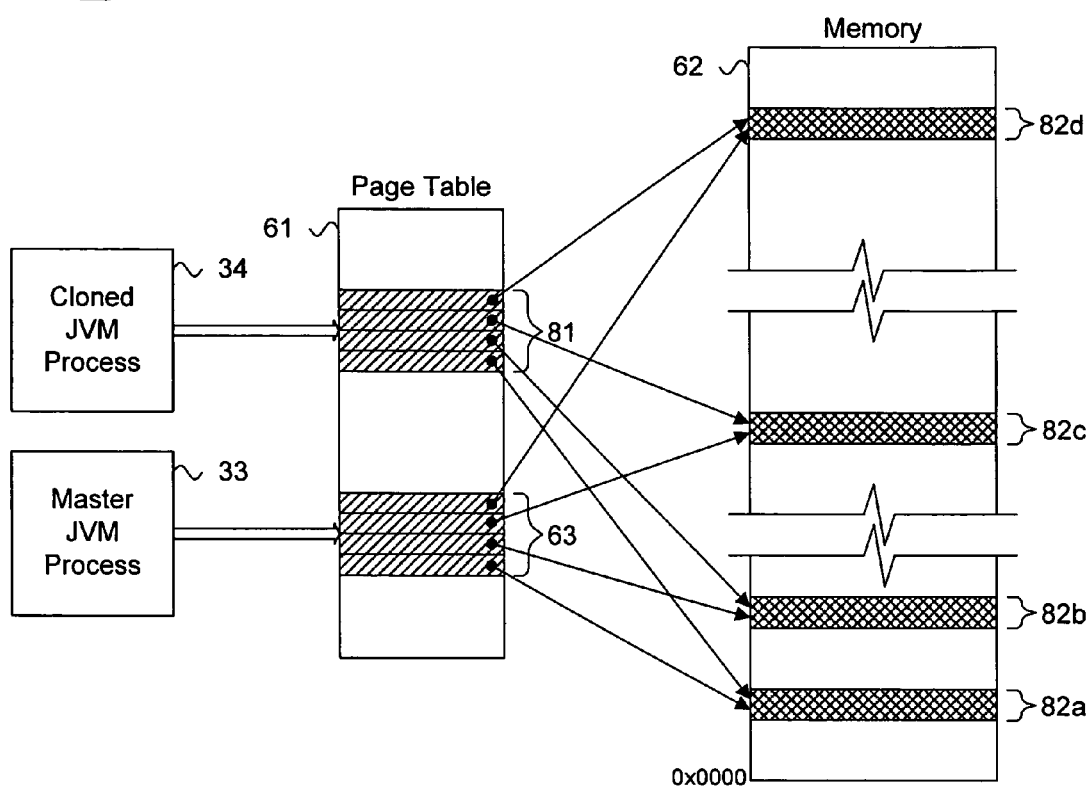
FIGS. 5A-B are block diagrams showing, by way of example, a master JVM process and a cloned JVM process mapped into memory through memory space cloning with copy-on-write semantics.
Figure 5B:
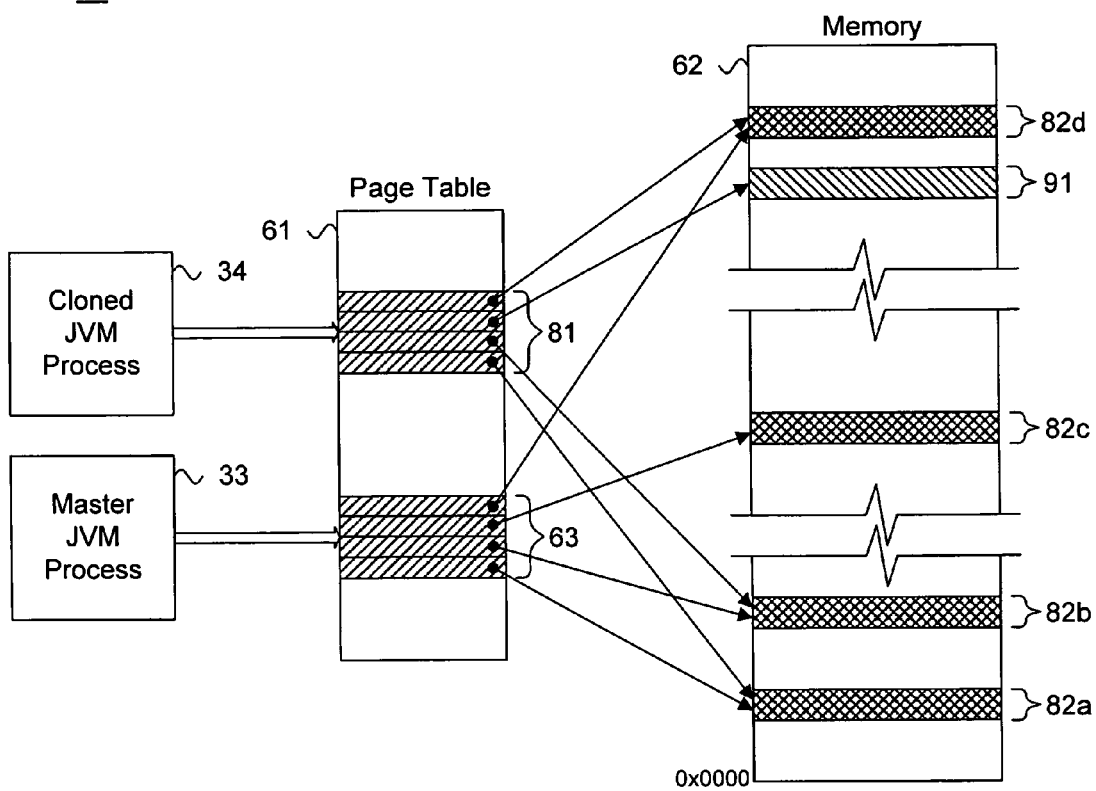

FIGS. 5A-B are block diagrams 80, 90 showing, by way of example, a master JVM process 33 and a cloned JVM process 34 mapped into memory 62 through memory space cloning with copy-on-write semantics. In a system with process cloning that provides copy-on-write semantics, only copies of the references, typically page table entries, to the memory space storing the parent process context are created for each child process. Referring first to FIG. 5A, in response to a process cloning request, the operating system copies only the page table entries 63 referencing the memory space of the executable master JVM process 33 as a new set of page table entries 81 for the cloned JVM process 34. Thus, the cloned JVM process 34 uses the same references to the possibly non-contiguous pages 64a-d storing the master JVM process context as the master JVM process 34. Initialization and execution of the application associated with the cloned JVM process 34 requires less time, as only the page table entries 62 are copied to clone the master JVM process context. Furthermore, until the cloned JVM process 34 attempts to modify the master JVM process context, the memory space is treated as read only data, which can be shared by other processes.

Referring next to FIG. 5B, the cloned JVM process 34 has attempted to modify one of the pages 82c in the memory space of the master JVM process context. In response, the operating system creates a physical copy of the to-be-modified memory space page 82c as a new page 91 and updates the allocation in the page table entries 81 for the cloned JVM process 34. Through copy-on-write semantics, the overall footprint of the runtime environment 31 is maintained as small as possible and only grows until, and if, each cloned JVM process 34 actually requires additional memory space for application-specific context.

Method for Preloading Classes

Figure 6:
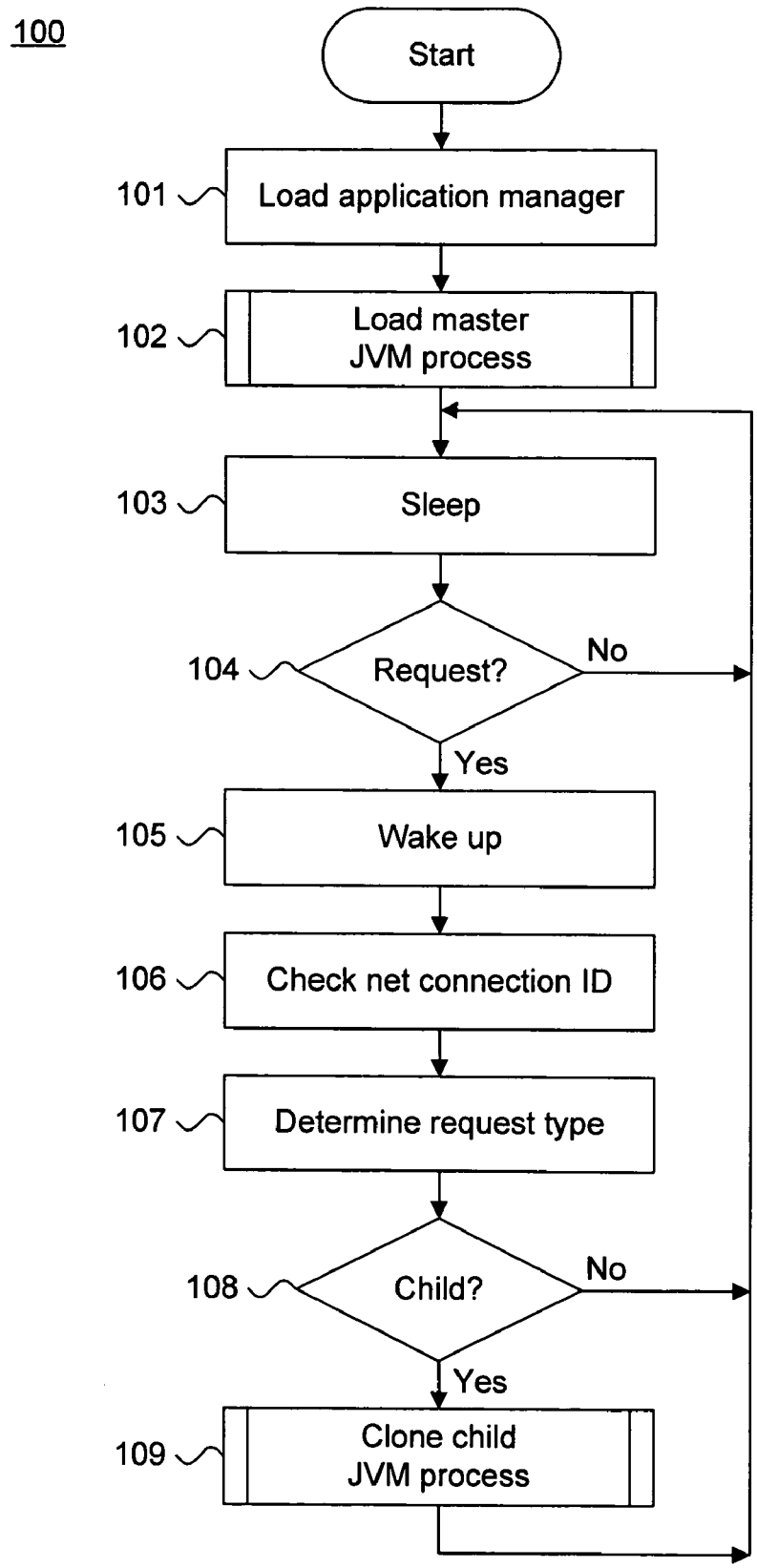
FIG. 6 is a flow diagram showing a method for dynamic preloading of classes through memory space cloning of a master runtime system process, in accordance with the invention.

FIG. 6 is a flow diagram, showing a method 100 for dynamic preloading of classes through memory space cloning of a master runtime system process, in accordance with the invention. The method 100 is described as a sequence of process operations or steps, which can be executed, for instance, by the runtime environment 31 of FIG. 2 or other components.

Initially, the application manager 32 is loaded (block 101). The master JVM process 33 is loaded and initialized at device boot time (block 102), as further described below with reference to FIG. 7. Following loading and initialization, the master JVM process 33 enters an inactive sleep mode (block 103). Upon receiving a request from the application manager 32 (block 104), the master JVM process 33 awakens (block 105). If necessary, the master JVM process 33 checks the network connection identifier (ID) (block 106) for the application manager 32 and determines the type of request (block 107). The master JVM process 33 recognizes the commands list, jexec, and kill, as described above with reference to FIG. 2. If the request type corresponds to a jexec request, instructing the master JVM process 33 to initiate an execution of an application through process cloning (block 108), a cloned JVM process 34 is cloned and executed (block 109), as further described below with reference to FIGS. 8 and 9. Processing continues indefinitely until the master JVM process 33 and the runtime environment 31 are terminated.

Routine for Loading Master JVM Process

Figure 7:
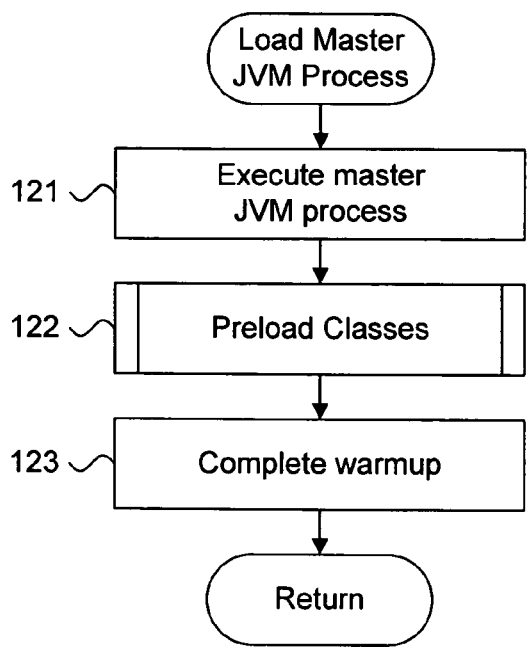
FIG. 7 is a flow diagram showing the routine for loading a master JVM process for use in the method of FIG. 6.

FIG. 7 is a flow diagram showing the routine 120 for loading a master JVM process 33 for use in the method 100 of FIG. 6. One purpose of the routine is to invoke the master JVM process 33 and to preload classes into the prewarmed state 41 for inheritance by cloned JVM processes 34.

Initially, the master JVM process 33 begins execution at device boot time (block 121). The master JVM process 33 then preloads classes as a part of the initialization process (block 122), as further described below with reference to FIG. 10. Briefly, preloading classes involves executing the bootstrap class loader 39 and system application class loader 40 to create and resolve classes likely required by one or more of the applications. The master JVM process 33 completes any other warmup operations (block 123) and the routine returns.

Routine for Process Cloning without Copy-On-Write

Figure 8:
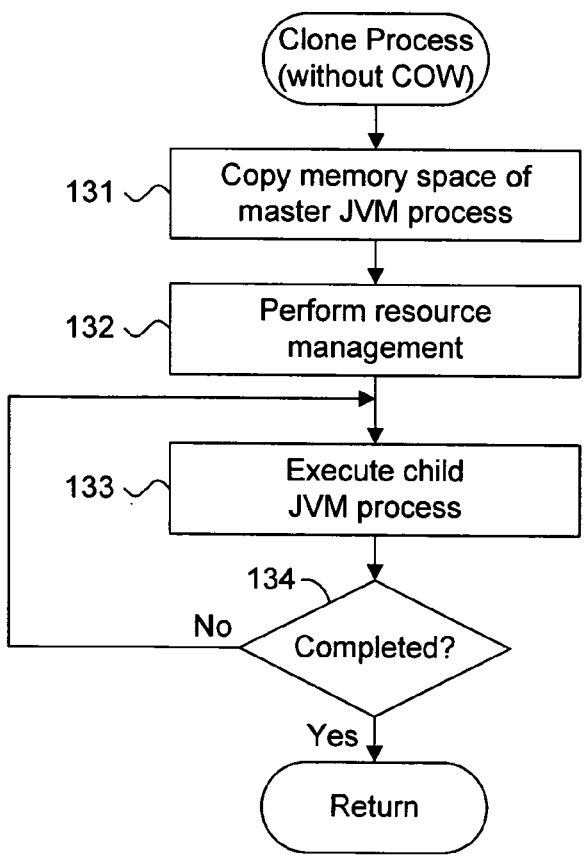
FIG. 8 is a flow diagram showing the routine for cloning a process without copy-on-write semantics for use in the method of FIG. 6.

FIG. 8 is a flow diagram showing the routine 130 for cloning a process without copy-on-write for use in the method 100 of FIG. 6. One purpose of the routine is to create and initiate execution of a cloned JVM process 34 through process cloning that does not provide copy-on-write semantics.

Initially, the memory space containing the context of the master JVM process 33 is physically copied into a new memory space for the cloned JVM process 34 (block 131). Optionally, the master JVM process 33 can set operating system level resource management parameters over the cloned JVM process 34 (block 132), including setting scheduling priorities and limiting processor and memory consumption. Other types of resource management controls are possible. The cloned JVM process 34 is then executed by the runtime environment 31 (block 133) using the duplicated master JVM process context. The routine returns upon the completion (block 134) of the cloned JVM process 34.

Routine for Process Cloning with Copy-On-Write

Figure 9:
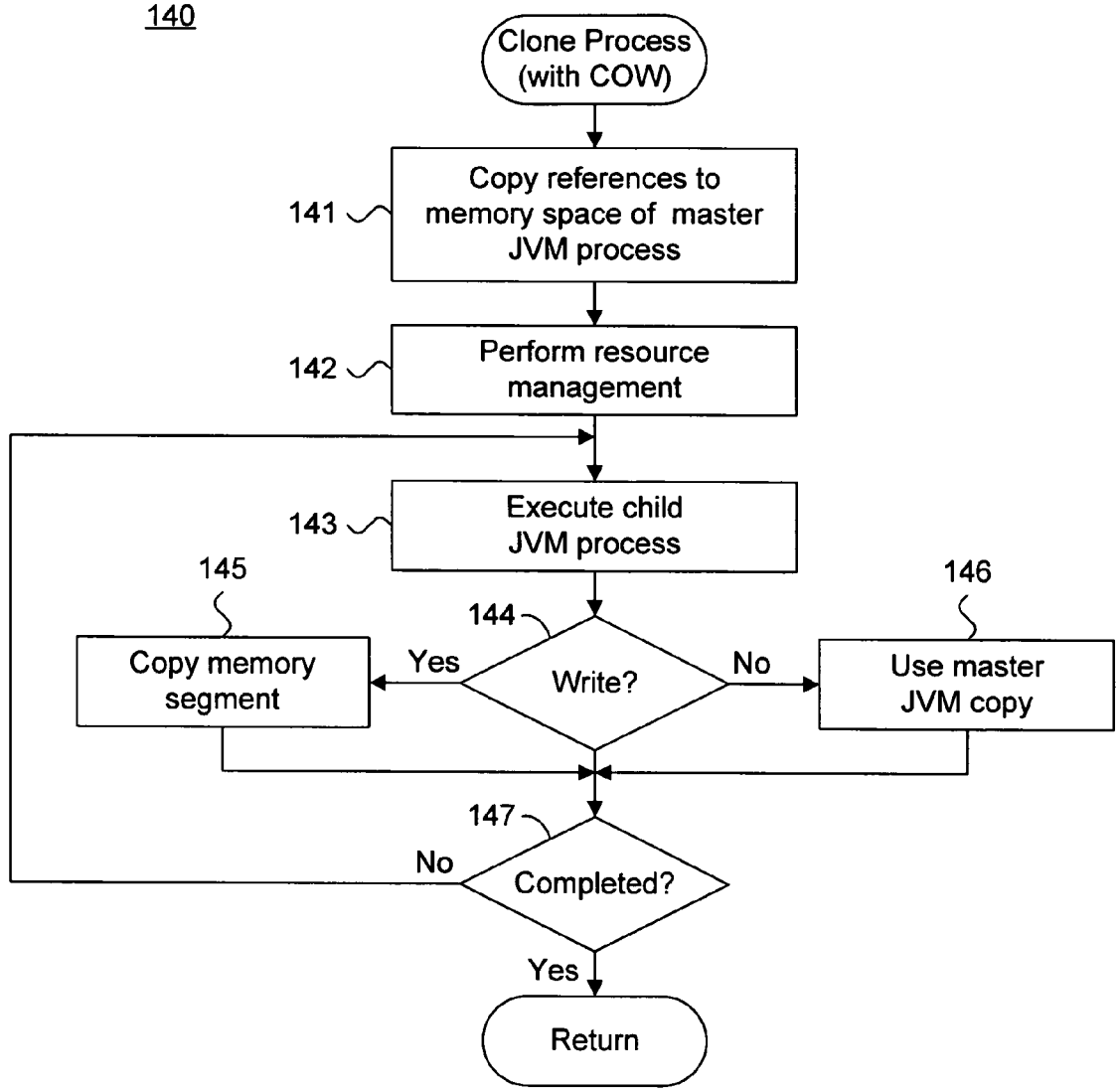
FIG. 9 is a flow diagram showing the routine for cloning a process with copy-on-write semantics for use in the method of FIG. 6.

FIG. 9 is a flow diagram showing the routine 140 for cloning a process with copy-on-write for use in the method 100 of FIG. 6. One purpose of the routine is to create and initiate execution of a cloned JVM process 34 through process cloning that provides copy-on-write semantics.

Initially, references to the memory space containing the context of the master JVM process 33 are copied for the cloned JVM process 34 (block 141). Optionally, the master JVM process 33 can set operating system level resource management parameters over the cloned JVM process 34 (block 142), including setting scheduling priorities and limiting processor and memory consumption. Other types of resource management controls are possible. The cloned JVM process 34 is then executed by the runtime environment 31 (block 143) using the referenced master JVM process context. Each time the cloned JVM process 34 attempts to write into the memory space referenced to the master JVM process context (block 144), the operating system copies the applicable memory segment (block 145). Otherwise, the cloned JVM process 34 continues to use the referenced master JVM process context (block 146), which is treated as read only data. The routine returns upon the completion (block 147) of the cloned JVM process 34.

Routine for Preloading Class

Figure 10:
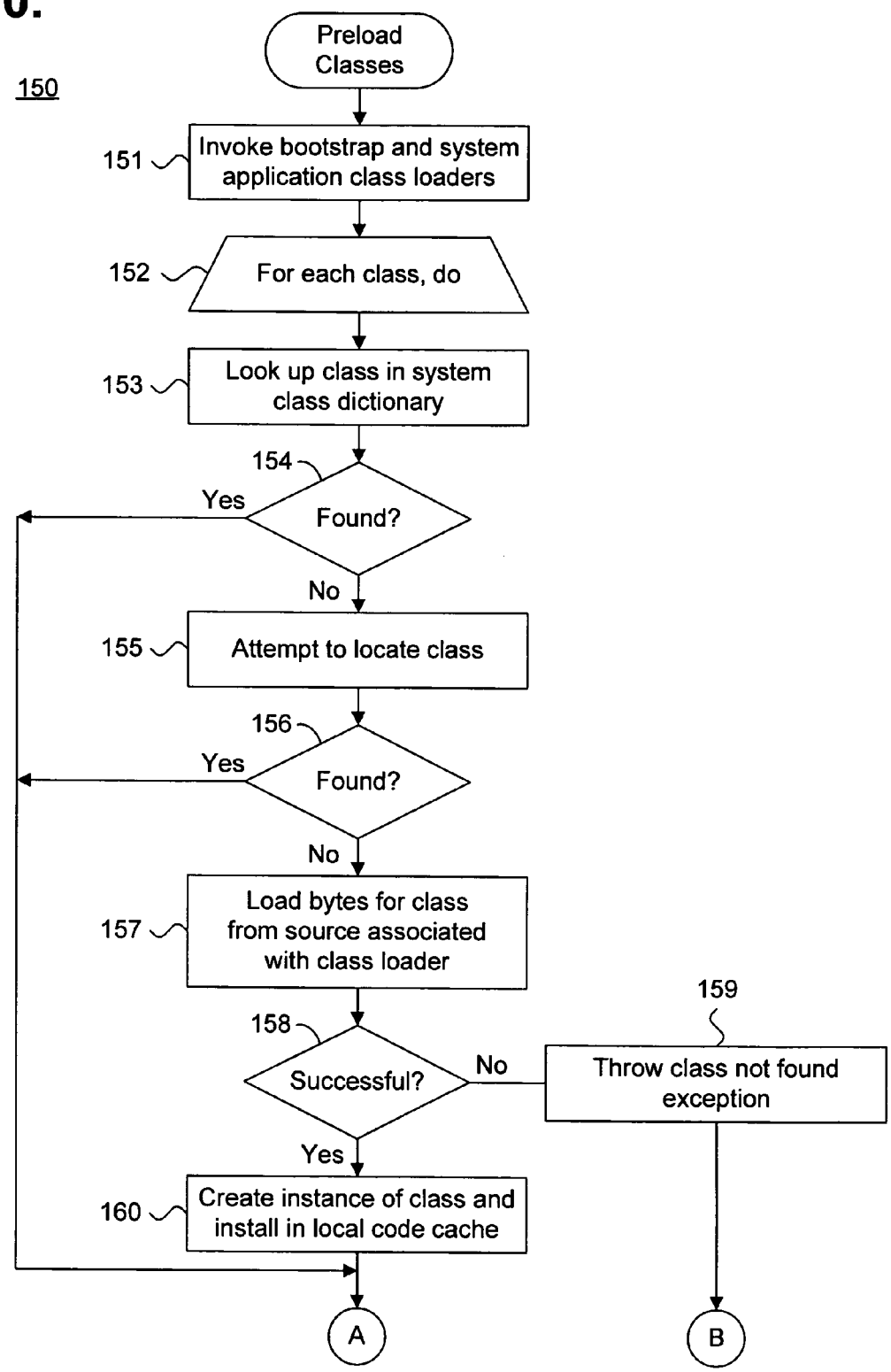
FIG. 10 is a flow diagram showing the routine for preloading a class for use in the routine of FIG. 7.
Figure 10:
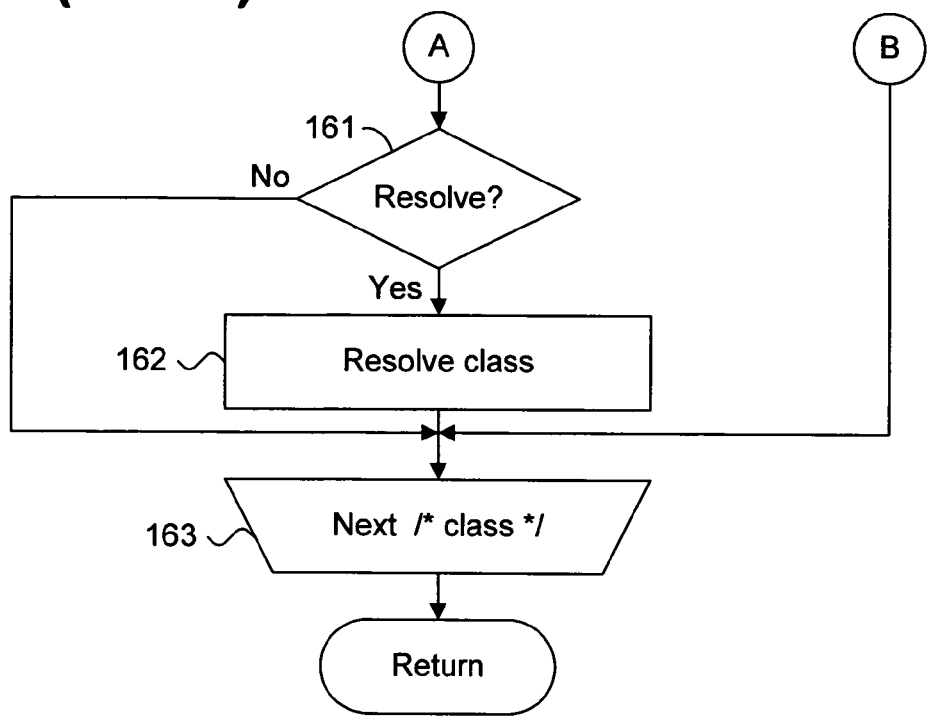

FIG. 10 is a flow diagram showing the routine 150 for preloading a class 36 for use in the routine 120 of FIG. 7. One purpose of the routine is to find and instantiate prewarmed instances of classes 36 and classes defined in the class libraries 37 as specified in the bootstrap class loader 39 and system application class loader 40 as prewarmed state 41 in the master JVM process 33 for inheritance by a cloned JVM process 34.

Initially, the bootstrap class loader 39 and system application class loader 40 is located and invoked by the master JVM process 33 (block 151). Each class 36 and class contained in a class library 37 is then iteratively processed (blocks 152-163) as follows. First, the master JVM process 33 attempts to locate the class in a system class dictionary (block 153). If the class is found (block 154), no further class loading need be performed. Otherwise, the master JVM process 33 attempts to locate the class (block 155) through standard Java class path location. If the class is found (block 156), no further class loading need be performed. Otherwise, the master JVM process 33 attempts to load the bytes for the class from the source associated with the applicable bootstrap class loader 39 and system application class loader 40 (block 157). If successful (block 158), an instance of the class is created by compiling the source and the class instance is installed in the system class dictionary (block 160). If the bytes for the class cannot be loaded from the source (block 158), the master JVM process 33 throws a class not found exception (block 159). Following the loading or attempted loading of the class, if the class requires resolution with respect to symbolic references (block 161), the class is resolved by identifying the applicable class loader for the fully qualified class (block 162). Processing continues with the next class (block 163), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for dynamic preloading of classes through memory space cloning of a master runtime system process, comprising:
    A processor; A memory a class preloader to obtain a representation of at least one class from a source definition provided as object-oriented program code;
    a master runtime system process to interpret and to instantiate the representation as a class definition in a memory space of the master runtime system process;
    a runtime environment to clone the memory space as a child runtime system process responsive to a process request and to execute the child runtime system process; and
    a copy-on-write process cloning mechanism to instantiate the child runtime system process by copying references to the memory space of the master runtime system process into a separate memory space for the child runtime system process, and to defer copying of the memory space of the master runtime system process until the child runtime system process needs to modify the referenced memory space of the master runtime system process.

2. A system according to claim 1, further comprising:
    a cache checker to determine whether the instantiated class definition is available in a local cache associated with the master runtime system process.

3. A system according to claim 2, further comprising:
    a class locator to locate the source definition if the instantiated class definition is unavailable in the local cache.

4. A system according to claim 1, further comprising:
    a class resolver to resolve the class definition.

5. A system according to claim 1, further comprising:
    at least one of a local and remote file system to maintain the source definition as a class file.

6. A system according to claim 1, further comprising:
    a process cloning mechanism to instantiate the child runtime system process by copying the memory space of the master runtime system process into a separate memory space for the child runtime system process.

7. A system according to claim 1, wherein the master runtime system process is caused to sleep relative to receiving the process request.

8. A system according to claim 1, wherein the object-oriented program code is written in the Java programming language.

9. A system according to claim 8, wherein the master runtime system process and the child runtime system process are Java virtual machines.

10. A method for dynamic preloading of classes through memory space cloning of a master runtime system process, comprising:
    executing a master runtime system process;
    obtaining a representation of at least one class from a source definition provided as object-oriented program code;
    interpreting and instantiating the representation as a class definition in a memory space of the master runtime system process; and
    cloning the memory space as a child runtime system process responsive to a process request and executing the child runtime system process;
    wherein cloning the memory space as a child runtime system process involves instantiating the child runtime system process by copying references to the memory space of the master runtime system process into a separate memory space for the child runtime system process; and wherein copying references to the memory space of the master runtime system process defers copying of the memory space of the master runtime system process until the child runtime system process needs to modify the referenced memory space of the master runtime system process.

11. A method according to claim 10, further comprising: determining whether the instantiated class definition is available in a local cache associated with the master runtime system process.

12. A method according to claim 11, further comprising: locating the source definition if the instantiated class definition is unavailable in the local cache.

13. A method according to claim 10, further comprising: resolving the class definition.

14. A method according to claim 10, further comprising: maintaining the source definition as a class file on at least one of a local and remote file system.

15. A method according to claim 10, further comprising: instantiating the child runtime system process by copying the memory space of the master runtime system process into a separate memory space for the child runtime system process.

16. A method according to claim 10, further comprising: causing the master runtime system process to sleep relative to receiving the process request.

17. A method according to claim 10, wherein the object-oriented program code is written in the Java programming language.

18. A method according to claim 17, wherein the master runtime system process and the child runtime system process are Java virtual machines.

19. A computer-readable storage medium holding code for performing the method according to claim 10.

20. An apparatus for dynamic preloading of classes through memory space cloning of a master runtime system process, comprising:
  A processor; A memory means for executing a master runtime system process;
  means for obtaining a representation of at least one class from a source definition provided as object-oriented program code;
  means for interpreting and means for instantiating the representation as a class definition in a memory space of the master runtime system process; and
  means for cloning the memory space as a child runtime system process responsive to a process request and means for executing the child runtime system process;
  wherein the means for cloning the memory space is configured to clone the memory space of a child runtime system process using a copy-on-write process cloning mechanism that instantiates the child runtime system process by copying references to the memory space of the master runtime system process into a separate memory space for the child runtime system process and that defers copying of the memory space of the master runtime system process until the child runtime system process needs to modify the referenced memory space of the master runtime system process.

21. A system according to claim 1, further comprising:
a resource controller to set operating system level resource management parameters on the child runtime system process.

22. A method according to claim 10, further comprising:
setting operating system level resource management parameters on the child runtime system process.

* * * * *

INTER PARTES REEXAMINATION CERTIFICATE (861st)

United States Patent
Fresko

(10) Number: US 7,426,720 C1
(45) Certificate Issued: *Apr. 21, 2014

(54) SYSTEM AND METHOD FOR DYNAMIC PRELOADING OF CLASSES THROUGH MEMORY SPACE CLONING OF A MASTER RUNTIME PROCESS

(75) Inventor: Nedim Fresko, San Francisco, CA (US)

(73) Assignee: Sun Microsystems, Inc., Santa Clara, CA (US)

Reexamination Request:
No. 95/001,560, Mar. 1, 2011

Reexamination Certificate for:
Patent No.: 7,426,720
Issued: Sep. 16, 2008
Appl. No.: 10/745,023
Filed: Dec. 22, 2003

(*) Notice: This patent is subject to a terminal disclaimer.

(51) Int. Cl.
*G06F 9/45* (2006.01)

(52) U.S. Cl.
USPC ........... 717/140; 717/151; 717/152; 717/153; 718/1

(58) Field of Classification Search
USPC ........................................ 717/140
See application file for complete search history.

(56) References Cited

To view the complete listing of prior art documents cited during the proceeding for Reexamination Control Number 95/001,560, please refer to the USPTO's public Patent Application Information Retrieval (PAIR) system under the Display References tab.

*Primary Examiner* — Mary Steelman

(57) ABSTRACT

A system and method for dynamic preloading of classes through memory space cloning of a master runtime system process is presented. A master runtime system process is executed. A representation of at least one class is obtained from a source definition provided as object-oriented program code. The representation is interpreted and instantiated as a class definition in a memory space of the master runtime system process. The memory space is cloned as a child runtime system process responsive to a process request and the child runtime system process is executed, inheriting the memory state of the parent, which reflects the data structures and state corresponding to the preloaded classes.

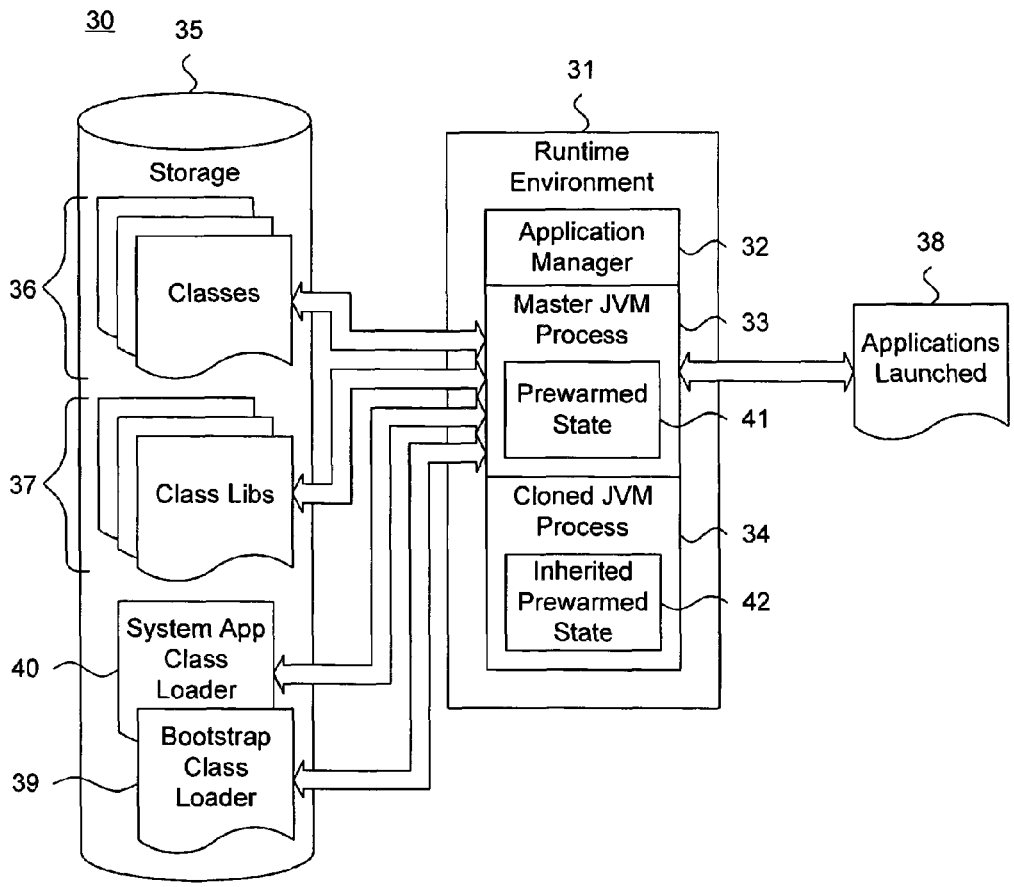

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8, 10-17 and 19-22 are cancelled.

Claims 9 and 18 were not reexamined.

\* \* \* \* \*